(12) United States Patent
Wangkhem et al.

(10) Patent No.: US 9,529,662 B1
(45) Date of Patent: Dec. 27, 2016

(54) DYNAMIC RULE-BASED AUTOMATIC CRASH DUMP ANALYZER

(71) Applicant: NetApp, Inc., Sunnyvale, CA (US)

(72) Inventors: Karnajit Wangkhem, Bangalore (IN); Rupin Ghetiya, Bangalore (IN); Ghisiawan Prasad Jaiswal, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 45 days.

(21) Appl. No.: 14/815,094

(22) Filed: Jul. 31, 2015

(51) Int. Cl.
*G06F 11/00* (2006.01)
*G06F 11/07* (2006.01)

(52) U.S. Cl.
CPC ......... *G06F 11/079* (2013.01); *G06F 11/0709* (2013.01); *G06F 11/0751* (2013.01); *G06F 11/0778* (2013.01)

(58) Field of Classification Search
CPC ... G06F 11/0778; G06F 11/079; G06F 11/366; G06F 11/3636; G06F 11/0793; G06F 11/362; G06F 11/0784; G06F 11/2268; G06F 11/3632; G06F 11/3664
See application file for complete search history.

(56) References Cited

U.S. PATENT DOCUMENTS

| | | | | |
|---|---|---|---|---|
| 6,681,348 | B1* | 1/2004 | Vachon | G06F 11/0778 |
| | | | | 714/38.11 |
| 9,378,368 | B2* | 6/2016 | Piper | G06F 11/0748 |
| 2003/0140278 | A1* | 7/2003 | Holland | G06Q 10/04 |
| | | | | 714/25 |
| 2007/0074149 | A1* | 3/2007 | Ognev | G06F 11/366 |
| | | | | 717/101 |
| 2009/0063651 | A1* | 3/2009 | Brahmavar | G06F 11/0709 |
| | | | | 709/212 |
| 2014/0359077 | A1* | 12/2014 | Chung | H04L 67/06 |
| | | | | 709/219 |

* cited by examiner

*Primary Examiner* — Nadeem Iqbal
(74) *Attorney, Agent, or Firm* — Klein, O'Neill & Singh, LLP

(57) ABSTRACT

A method and system for dynamic rule-based automatic crash dump analysis are described. In an example, a dynamic rule-based crash dump analysis system retrieves debug symbol data, rules, and commands from a server over a network. The actions are executed based on the retrieved rules in order to automatically analyze a crash dump using a debugger and the debug symbol data. During the process of analyzing the crash dump, the system parses output from the debugger for further rule processing and creates a human-readable analysis file from the parsed output.

20 Claims, 8 Drawing Sheets

DYNAMIC RULE-BASED AUTOMATIC CRASH DUMP ANALYZER

TECHNICAL FIELD

Examples described herein relate to computer troubleshooting, and more specifically, to a system and method for dynamically analyzing crash dumps.

BACKGROUND

A crash dump, also known as a core dump, memory dump, or a system dump, contains the memory state of a computer system at a given time which is written to storage by the system, usually in the case of a system crash or fatal error. Crash dumps can be used with or without manual intervention to aid in debugging certain problem scenarios, such as the cause of the crash or error. Normally, analysis of crash dump files through a debugging program requires an engineer to run through certain decisions making processes to arrive at a conclusive result. These decision paths are typically taken based on command outputs from the debugger and can range from outputting a single variable to long-running and lengthy output macros. Often, these decision paths are repetitive and based on certain familiar or popular command outputs.

With cheaper dynamic/static random access memory (DRAM/SRAM), systems with large amounts of RAM are becoming commonplace. Several high end systems like enterprise storage controllers benefit greatly from more RAM in providing high end solutions. Correspondingly, the crash dumps generated from such systems are no longer small and continue increasing in the range of their system memory. Uploading these large crash dumps to remote support sites introduces several issues in regards to bandwidth limitations and unsuccessful or corrupted file transfers. Compression can be used to reduce the crash dump file size to some extent, but running compression algorithms on extremely large files can take hours or even days to compress and decompress.

In addition, analysis of crash dumps is greatly aided by symbol files containing debug symbol tables, which are data structures used by debuggers, compilers, and interpreters to store information about the occurrence of various entities such as variable names, function names, objects, classes, interfaces, etc. in program code. Since these symbol files can be used in reverse engineering programs, they are important company assets and any compromise with these assets is not acceptable.

The proposed system aims to provide a single, full-fledged solution to eliminate the need to upload huge crash dump files while also providing the debugger with the required symbol lookups with enough security to protect the symbol files from both the customer site as well as the internet. The system offloads all the manual work done by an engineer to an automated system through the use of decision trees.

DETAILED DESCRIPTION

Figure 1:
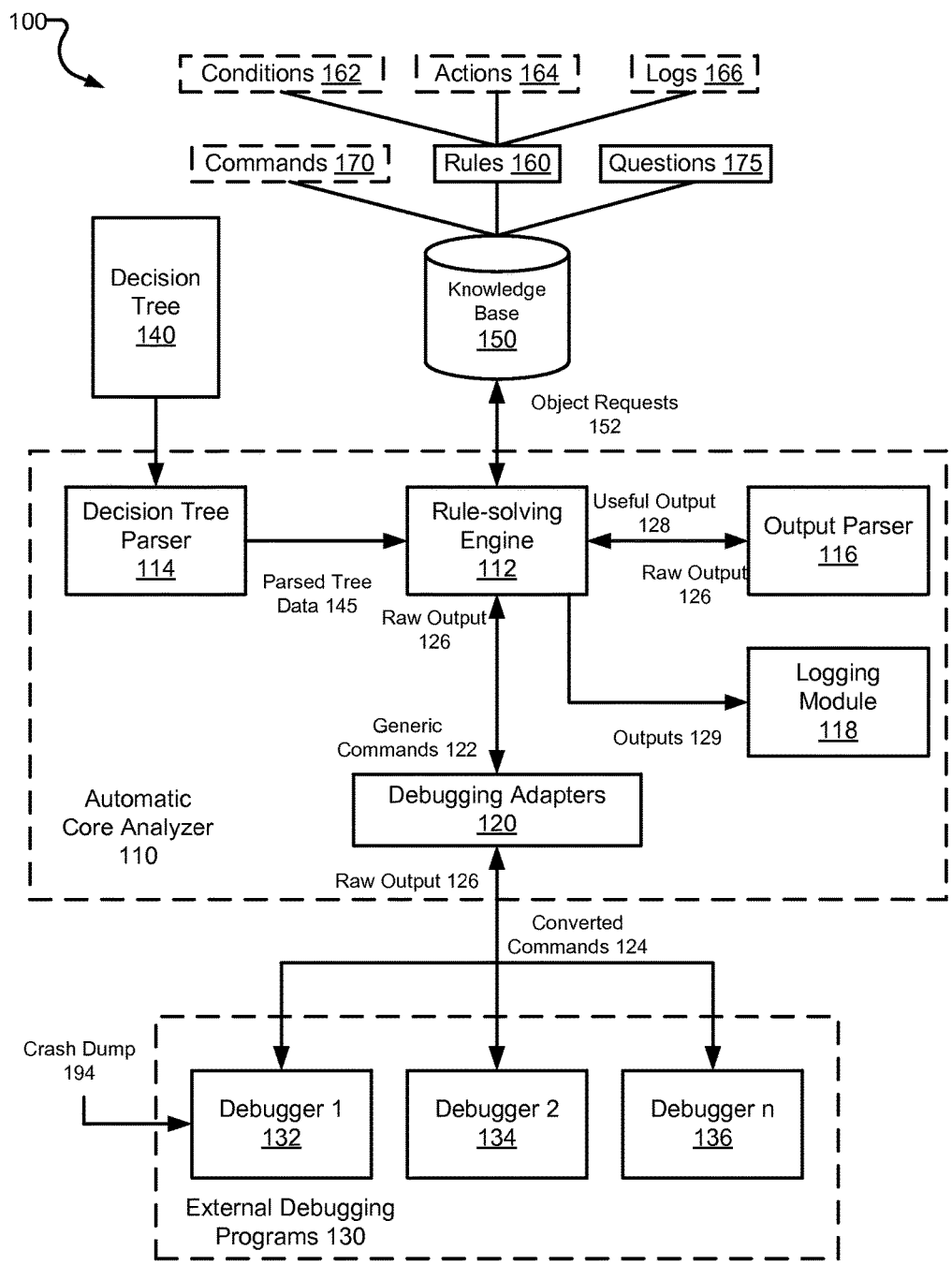
FIG. 1 illustrates an example system for dynamic rule-based crash dump analysis, in accordance with some aspects.

With the increasing size of crash dumps, it is becoming more difficult for customers to upload the dumps from local servers to remote hosts for debugging by qualified engineers with access to the proper tools. At worst, it can take from hours to even days to transfer the crash dump files with no guarantee of a successful transfer. There are various existing solutions involving analysis programs such as back-trace analyzers and bug signature analyzers which can be run without transferring the entire crash dump. However, these solutions are mainly targeted at frequently occurring bugs and require constant maintenance involving writing bug signatures for each bug. As a result, these are poor long-term solutions and not applicable in all cases. The proposed system is targeted to extracting the useful information from crash dumps and creating a small analysis file without requiring uploading the entire crash dump to a remote support site. Unlike previous solutions, a single well-crafted decision tree is enough to catch multiple bugs which can greatly decrease the manual maintenance work.

Ideally, a well-crafted decision tree should produce a small, self-sufficient analysis file that contains all the useful information from the crash dump. The analysis file can then be uploaded and examined by an engineer or technical support specialist to pinpoint an existing bug, discover a new bug, or find the underlying root cause of the crash. Even in a worst case scenario where the crash dump is uploaded for further examination, analyzing the crash dump using the decision trees can reduce the complexity of manual analysis. In addition, the decision tree analysis can at least identify the subsystem(s) in which the problem was observed so that further analysis can be better focused or assigned to someone with the correct expertise.

In an example, a dynamic rule-based crash dump analysis system retrieves debug symbol data, rules, and commands from a server over a network. The actions are executed based on the retrieved rules in order to automatically analyze a crash dump using a debugger and the debug symbol data. During the process of analyzing the crash dump, the system parses output from the debugger for further rule processing and creates a human-readable analysis file from the parsed output.

In some aspects, the actions are generic and designed to not be specific to the debugger. Instead, adapters can be created that adapt the generic actions to formats compatible with multiple different debuggers depending on the environment. In addition, the retrieved rules and actions can be contained in a decision tree or trees, which may be in XML format.

According to some examples, dynamic rule-based crash dump analysis also includes parsing the rules and actions from the decision tree and retrieving objects associated with those rules and commands from a database or knowledge base. The output from the parser can be used in further rule processing through a forward-chaining approach until all matching rules have been exhausted.

In one aspect, the debug symbol data retrieved from the remote server over the network is sufficient to create a symbol table to be used by a debugger along with the parsed rules and actions. In another aspect, the initial debug symbol data is insufficient and the debugger can request further debug symbol data from the server as needed during the crash dump analysis.

This approach for solving the problem of sending large crash dumps over a network uses expert system to provide a simple solution for a complex problem. It provides a neat solution which is scalable and extendable. The adapter interface provides enough extendibility for the infrastructure to interact with other systems (i.e., not limited to a specific debugging program) and hence serves as the base and infrastructure to solve various other problems.

Besides the bandwidth savings from remotely analysing crash dumps, in some circumstances customers in secure sites require crash dumps to be analyzed only by authorized personnel, which can mean the analysis has to be performed at a remote site. An automatic crash dump analyzer can help avoid the need to send engineers to remote sites for performing such analyses.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

In order to bring scalability, reliability and extendibility to the system, the infrastructure is designed with the knowledge of expert systems. A rule engine backend proves flexibility to create, modify, and remove rules and hence cleanly change a decision tree without involving any programmatic changes. Various concepts are introduced which allow the infrastructure to understand and run commands on any system (any entity which can take a command and provide a corresponding output) provided that a corresponding adapter is added. Output from these commands can then be converted to useful information for decision making through the parser modules, and a logger can present these outputs in plain text, HTML, or other formats with highlighting and other emphasis present to help identify the most pertinent data.

FIG. 1 illustrates a crash dump analysis system 100, within which dynamic rule-based crash dump analysis may be provided. The crash dump analysis system 100 includes an automatic core analyzer 110, external debugging programs 130, a decision tree 140, and knowledge base 150.

Decision tree 140 is a machine representation of an engineer's crash dump analyzing technique, which can be contained in one or more XML files or other formats suitable for being parsed. Decision tree 140 consists of pairs of rules and commands that mimic the process and decision making an engineer might perform for analyzing a crash dump 194 with a debugger. Storing decision tree 140 in a format such as XML allows changes to be made to decision tree 140 without programming language-specific changes to code run by other elements of the crash dump analysis system 100. In a remote deployment, the system 100 can pull decision tree 140 from a remote web server before initiating a crash dump analysis. Hence, any changes to decision tree 140 made remotely do not impact a currently running crash dump analysis at a client site, although updates to decision tree 140 can be made on a central server and retrieved by clients to keep them up-to-date. In other aspects, decision tree 140 can be manually acquired or retrieved from other sources.

Once pulled from the remote web server, the decision tree 140 is loaded into the automatic core analyzer 110 and can be parsed by decision tree parser 114. In aspects where the decision tree 140 is an XML file, decision tree parser 114 reads and separates the individual tags in the XML into their component commands, rules, actions, logs, and conditions, which make up parsed tree data 145. These parsed tags correspond to objects, or snippets of code, stored in knowledge base 150. Decision trees 140 in other formats can be similarly parsed into component tags that correspond to objects in the knowledge base 150.

The parsed tree data 145 is then sent to the main rule-solving engine 112 when requested by the rule-solving engine 112, which sends object requests 152 to pull objects identified in the parsed tree data 145 from the knowledge base 150, a repository for these objects. Any lookups concerning rules, commands, etc. are performed on the knowledge base 150 by the rule-solving engine 112. Objects stored in the knowledge base 150 take numerous forms depending on their functions. Rules 160, conditions 162, actions 164, logs 166, commands 170, and questions 175 are illustrated, although more categories and subcategories of objects can be stored in the knowledge base 150 depending on the complexity of the decision tree 140 and features of external debugging programs 130. Furthermore, although distinctions between object types are described, some types can be combined for simplicity. For example, commands 170 and actions 164 can both be considered "actions" in terms of objects.

A decision tree 140 can have multiple rules 160 in the parsed tree data 145. A rule 160 can consist of multiple conditions 162, actions 164, and logs 166. Rules 160 trigger the set of actions 164 when the conditions 162 are satisfied. Commands 170 define how a command can be executed by the external debugging programs 130. In some aspects, commands 170 are run before rules 160 are used to determine the rule conditions 162 or its actions 164. A macro used by a debugger such as GDB is an example of a command 170. In addition, the knowledge base 150 can also include questions 175 that require manual responses from users of the system 100.

Log tags 166 in rules 160 specify how a command 170 could be logged (e.g., print commands and highlight critical points). The modules interpret these tags and dump the corresponding output format either in text or HTML format. While analyzing the crash dump 194, certain levels of logging are provided, one of which is keyword logging. In some aspects, these keywords can serve the foundation of a bug prediction system.

An example decision tree 140 is provided below:

```
<xml>
<KB>
<rule name='wafl hung root">
<action attribute:"macro.memstat">run</action>
</rule>
<rule name="memstat assign">
<condition attribute="macro.memstat">run</condition>
<action attribute="value.kma">ROW(COLUMN(@macro.memstat, 5), 11)*4</action>
<action attribute="value.kma_limit.percent">20</action>
<action attribute="value.total_memory">ROW(COLUMN(@macro.memstat, 4), 3)*4</action>
</rule>
<rule name="kma check"">
<condition attribute="value.kma_limit.percent">< (((@value.kma*100)/@value.total_memory)</condition>
<action attribute="macro.leakdetector">run</action>
</rule>
<rule name="kma leak suspected"">
<condition attribute="macro.leakdetector'">run</condition>
<action attribute="value.e">Worked!</action>
<log cond="dummy">ROW(@macro.memstat, 11)</log>
<log cond="dummy">macro.leakdetector</log>
</rule>
<command attribute="macro.memstat">
<type>macro</type>
<cmd>memstat</cmd>
</command>
<command attribute="macro.leakdetector'">
<type>macro</type>
<source>/u/prdenz/gdbprd.scripts</source>
<cmd>memoryleakdetector</cmd>
</command>
</KB>
</xml>
```

This example decision tree 140 depicts 2 macros, memstat and leakdetector. The rules 160 instruct the rule-solving engine 112 to run leakdetector if kma takes up more than 20% of total memory. The COLUMN symbol and column number are used to extract the kma value from memstat output in this example. However, in other examples, regular expressions can be used to match and extract the proper values from program outputs. In addition, decision trees 140 can span multiple XML files. For example, command tags can be placed in a separate XML file from the rules and actions.

Rule-solving engine 112 can be regarded as the core which powers and connects all the components of the automatic core analyzer 110. In some aspects, forward chaining is used as the logic for solving the rules 160 read from the parsed tree data 145. Forward chaining starts with the available data from executed commands 170 and uses inference rules 160 to extract more data from the external debugging programs 130 and the crash dump 194 until all rules are solved or otherwise exhausted. An inference engine using forward chaining searches the inference rules 160 until it finds one where the antecedent (If clause) is known to be true. When such a rule is found, the engine can conclude, or infer, the consequent (Then clause), resulting in the addition of new information to its data. In this case, the rule-solving engine 112 runs until all the command 170 and condition 162 attributes are resolved or there is not enough data remaining in the crash dump 194 to resolve the attributes.

Commands 170 and actions 164 retrieved from the knowledge base 150 are processed by the rule-solving engine 112 as generic commands 122. However, these generic commands must first be converted to be compatible with one of the external debugging programs 130 available to the system 100. In some aspects, debugging adapters 120 are modules programmed to convert the generic commands 122 into converted commands 124 and interface with a specific debugger (local or remote) to invoke a command on it. The debugger executes the converted commands 124 on the crash dump 194 and returns a corresponding output. The debugging adapters 120 can also perform an authentication if required. This is the only part of the infrastructure which is non-generic. For example, an adapter for a storage controller may be able to perform certain tasks like automatic management, gathering statistical data, or performing certain workflows based on the objects retrieved from the knowledge base 150.

Depending on the system 100, one or more external debugging programs 130 may be available. For example, debugger 1 132 may be the GNU Debugger GDB, debugger 2 134 may be WinDbg, and debugger n 136 may be the Microsoft Visual Studio Debugger. Each of these debuggers has an associated debugging adapter 120 that was programmed for it. Once the external debugging program 130 receives the converted commands 124, it executes the commands on the crash dump 194 and returns raw output 126 to the rule-solving engine 112.

In some aspects, this raw output 126 can be difficult or impossible to read either by users or the rule-solving engine 112 itself. In order to convert the raw output 126, it is sent through an output parser 116 and turned into useful output 128. Output parser 116 is special parser which takes in raw outputs 126 from the debugging adapters 120 (through the rule-solving engine 112) and extracts useful information for further rule processing. Generally, the rules can contain certain symbols like ROW, COLUMN, REGX, etc. which carries these symbols on to the attribute value. The work of this module is to interpret these symbols, extract a value from the corresponding command output and substitute the new value to the expression. Attributes can be complex expressions and can also contain other attribute dependencies. Resolution of the dependencies is performed by the rule-solving engine 112.

Rule-solving engine 112 can then use the useful output 128 as further data in the forward chaining engine to solve more rules 160 and execute more actions 164. In addition, the rule-solving engine 112 can send outputs 129, either or both of raw output 126 and useful output 128, to a logging module 118, which can generate human-readable analysis files and logs. In one aspect, outputs 129 consist of raw output 126 modified by the log tags 166, which contain symbols for text highlighting and other features to facilitate human analysis, if needed. These files and logs can then be used by engineers to locate bugs and determine the root cause of a crash which produced the crash dump 194.

There are multiple approaches to make this solution work at a customer site. The first approach is to ship the symbol files to the customer site and run a debugger locally. The other approach involves establishing a secure connection between a web server with the symbol files and the customer site to fetch the symbols for the debugger running locally on the customer site. The detailed explanations of these approaches are given below.

Figure 2:
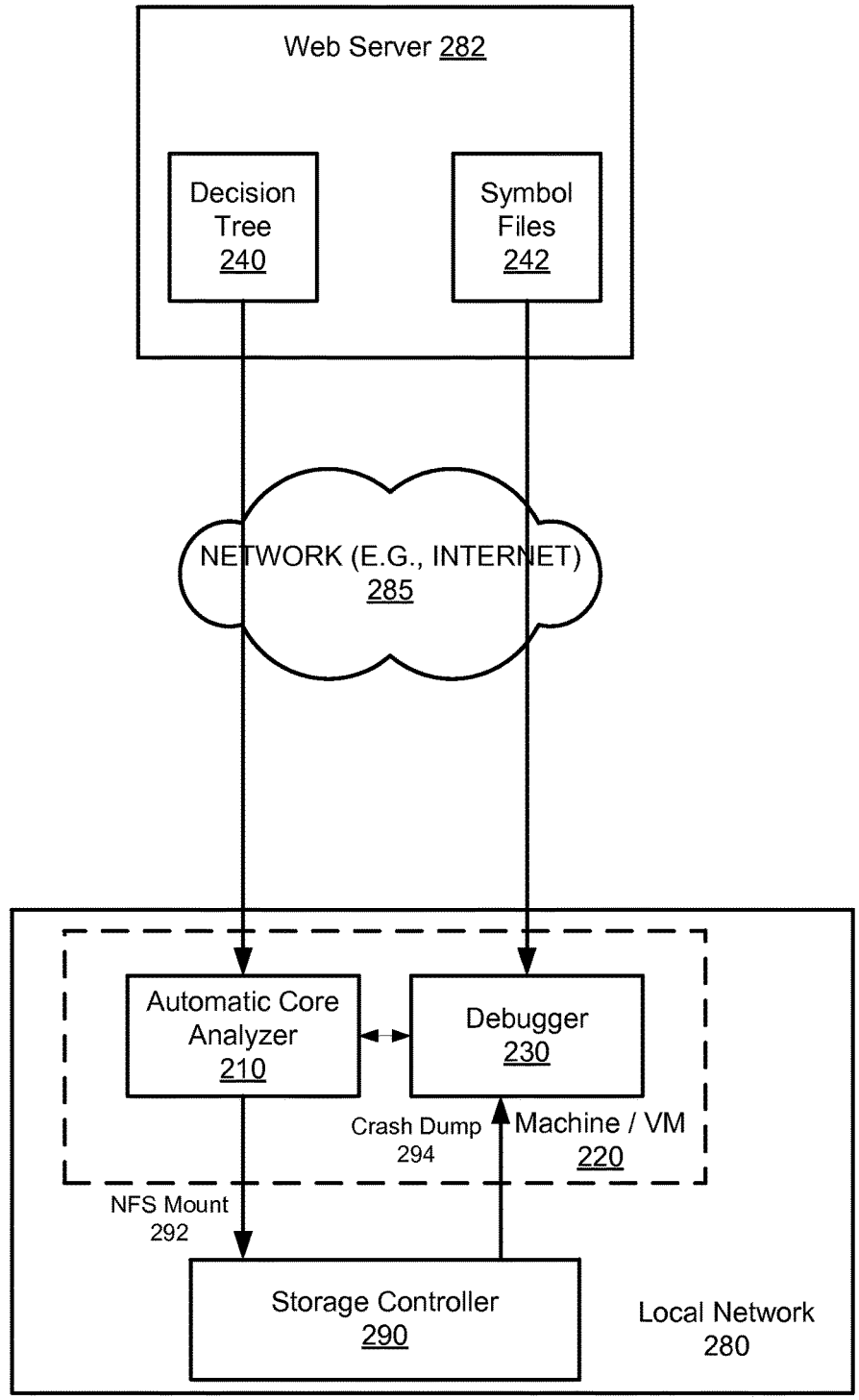
FIG. 2 illustrates an example remote analysis approach that transfers symbol files to a customer site.

FIG. 2 illustrates an example remote analysis approach that transfers symbol files 242 to a customer site represented by local network 280.

In this approach, a machine or virtual machine 220 performs an NFS mount 292 on another system (e.g., storage controller 290) after a crash and accesses the crash dump 294. In some aspects, this can be performed automatically after the storage controller 290 reboots. In other examples, the storage controller 290 can be mounted using other file systems and mounting applications.

Once the crash dump 294 has been loaded into the debugger 230, the machine/VM 220 runs the infrastructure by fetching symbol files 242 and the decision tree 240 from a web server 282. In some aspects, these files can be retrieved over a network such as the Internet 285 by using HTTP, FTP, or a similar protocol. In this setup, it is assumed that the customer can have access to the symbol files 242 and security is only at the session level.

Methodology

Figure 3:
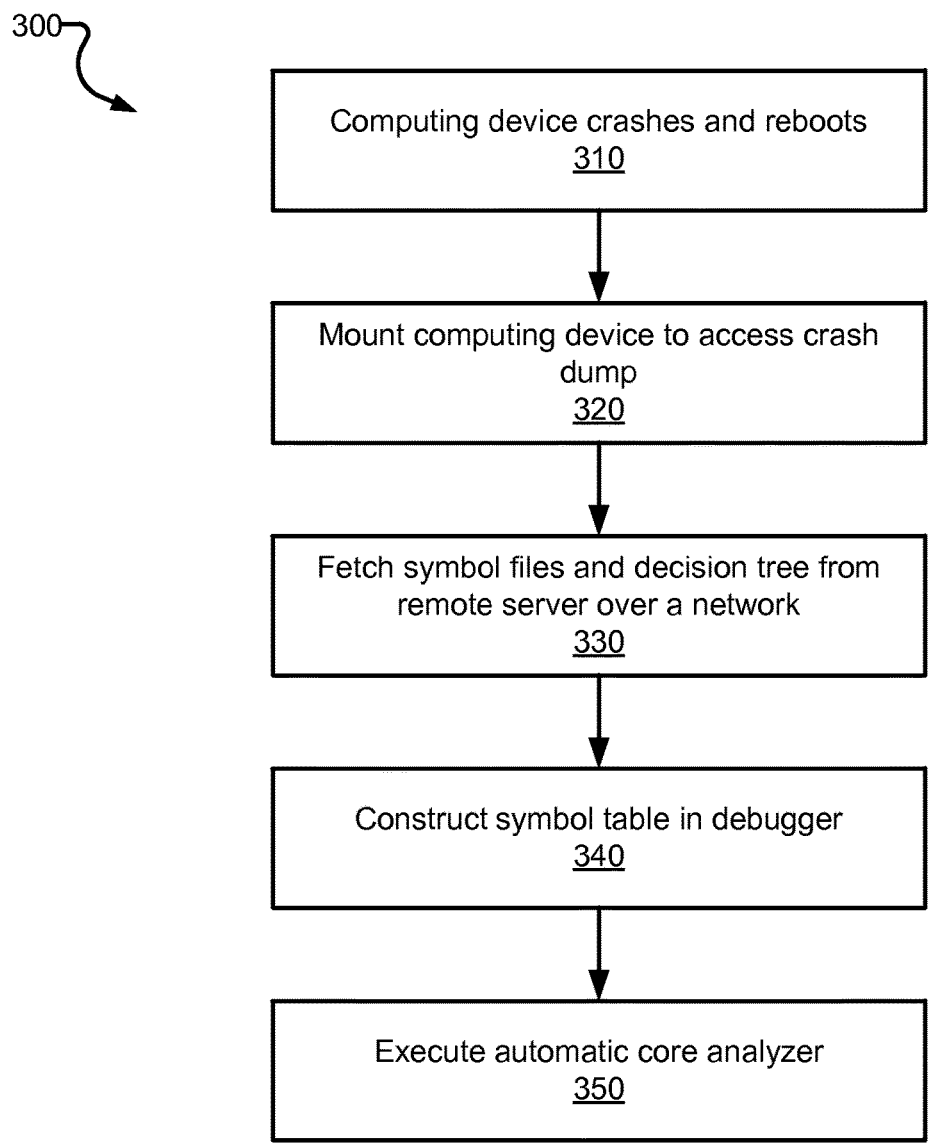
FIG. 3 illustrates an example method for remote analysis with symbol files transferred to a customer site, in accordance with some aspects.
Figure 5:
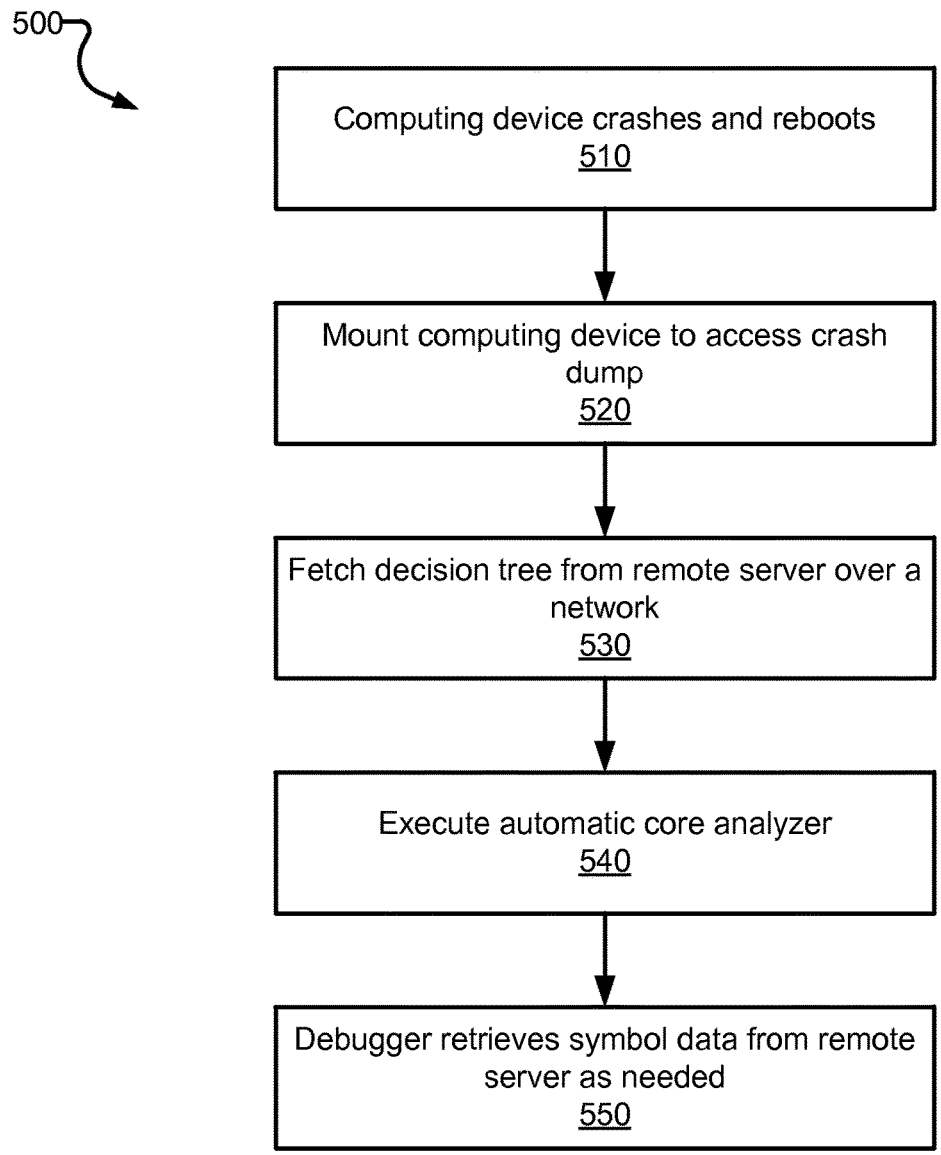
FIG. 5 illustrates an example method for remote analysis that only transfers symbol table data as required during a debugging process, in accordance with some aspects.
Figure 6:
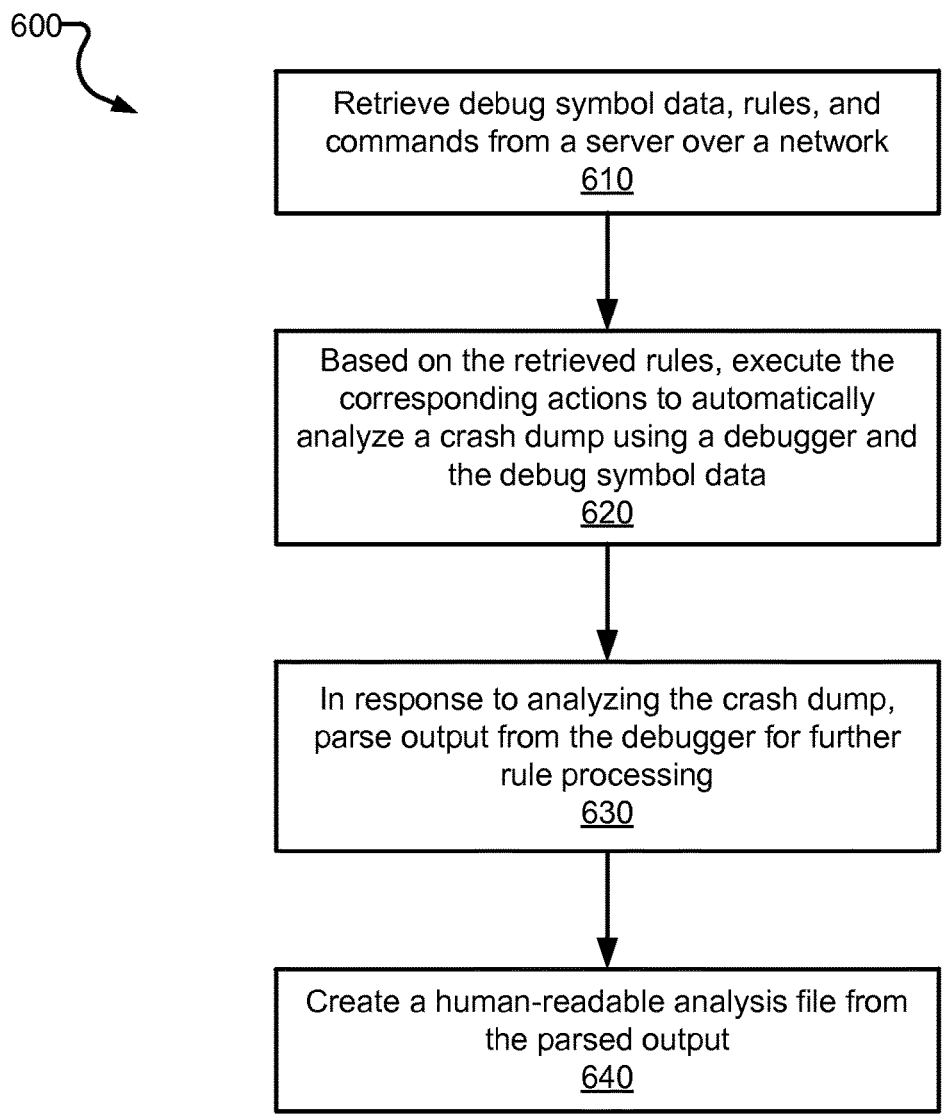
FIG. 6 illustrates an example method for dynamic rule-based crash dump analysis, in accordance with some aspects.
Figure 7:
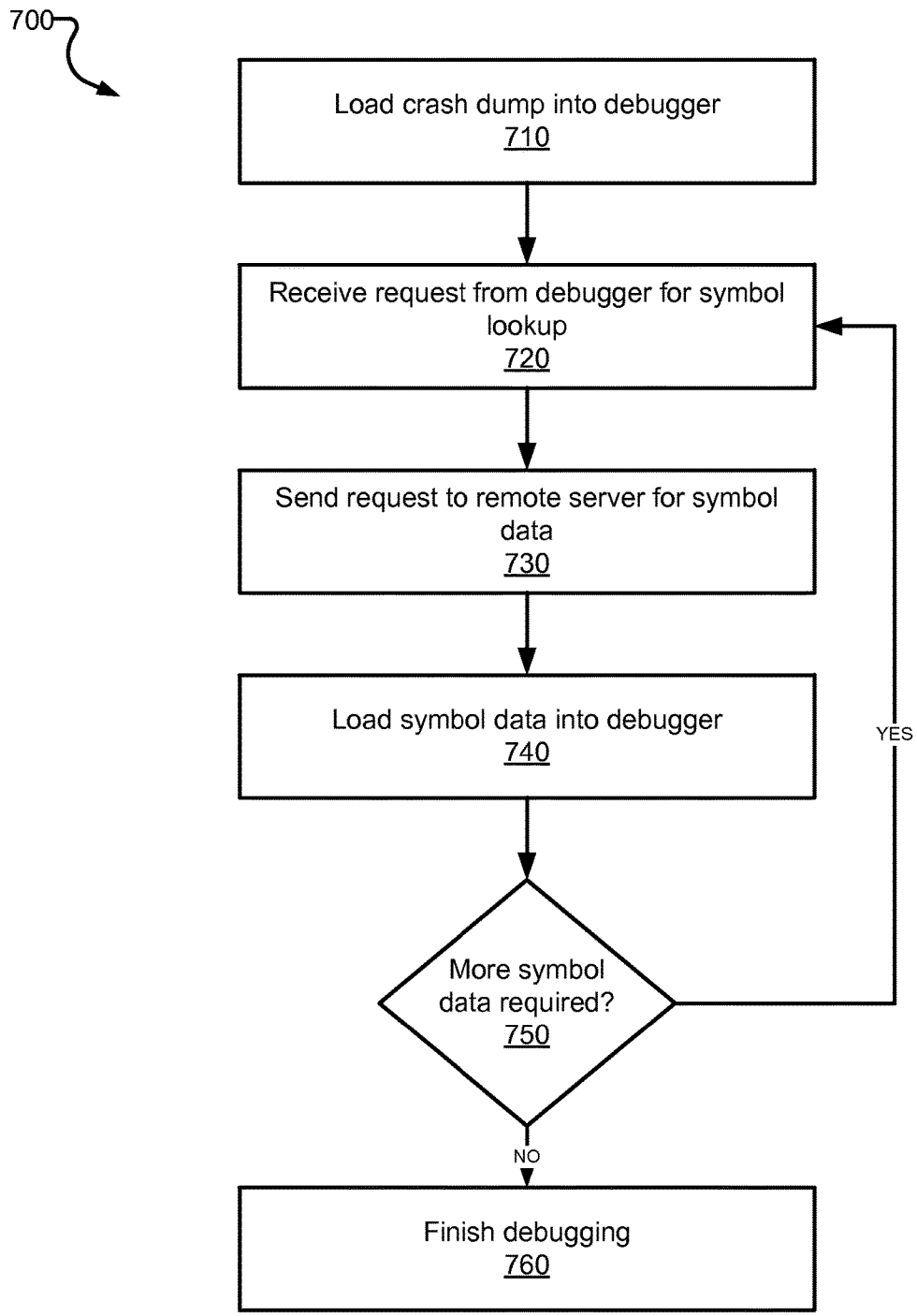
FIG. 7 illustrates an example method for secure debugging with symbol files accessed over a network, in accordance with some aspects.

FIG. 3 illustrates an example method for remote analysis with symbol files transferred to a customer site, in accordance with some aspects. FIG. 5 illustrates an example method for remote analysis that only transfers symbol table data as required during a debugging process, in accordance with some aspects. FIG. 6 illustrates an example method for dynamic rule-based crash dump analysis, in accordance with some aspects. FIG. 7 illustrates an example method for secure debugging with symbol information accessed over a network, in accordance with some aspects.

While operations of the methods 300, 500, 600, and 700 are described below as being performed by specific components, modules or systems of the computer system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

With reference to an example of FIG. 3, a computing device crashes and reboots, for example the storage controller 290 as described with FIG. 2 (310). A machine/virtual machine 220 running the automatic core analyzer 210 and a debugger 230 mounts the storage controller 290 in order to access the crash dump 294 (320). Next, the machine/virtual machine 220 fetches symbol files 242 and a decision tree 240 from web server 282 over a network 285 (330). With the symbol files 242, the debugger 230 constructs a symbol table that can be used to help the automatic core analyzer 210 debug the cause of the crash (340). The machine/virtual machine 220 then executes the automatic core analyzer 210 using the decision tree 240 in a manner as described with respect to FIG. 1 (350).

Figure 4:
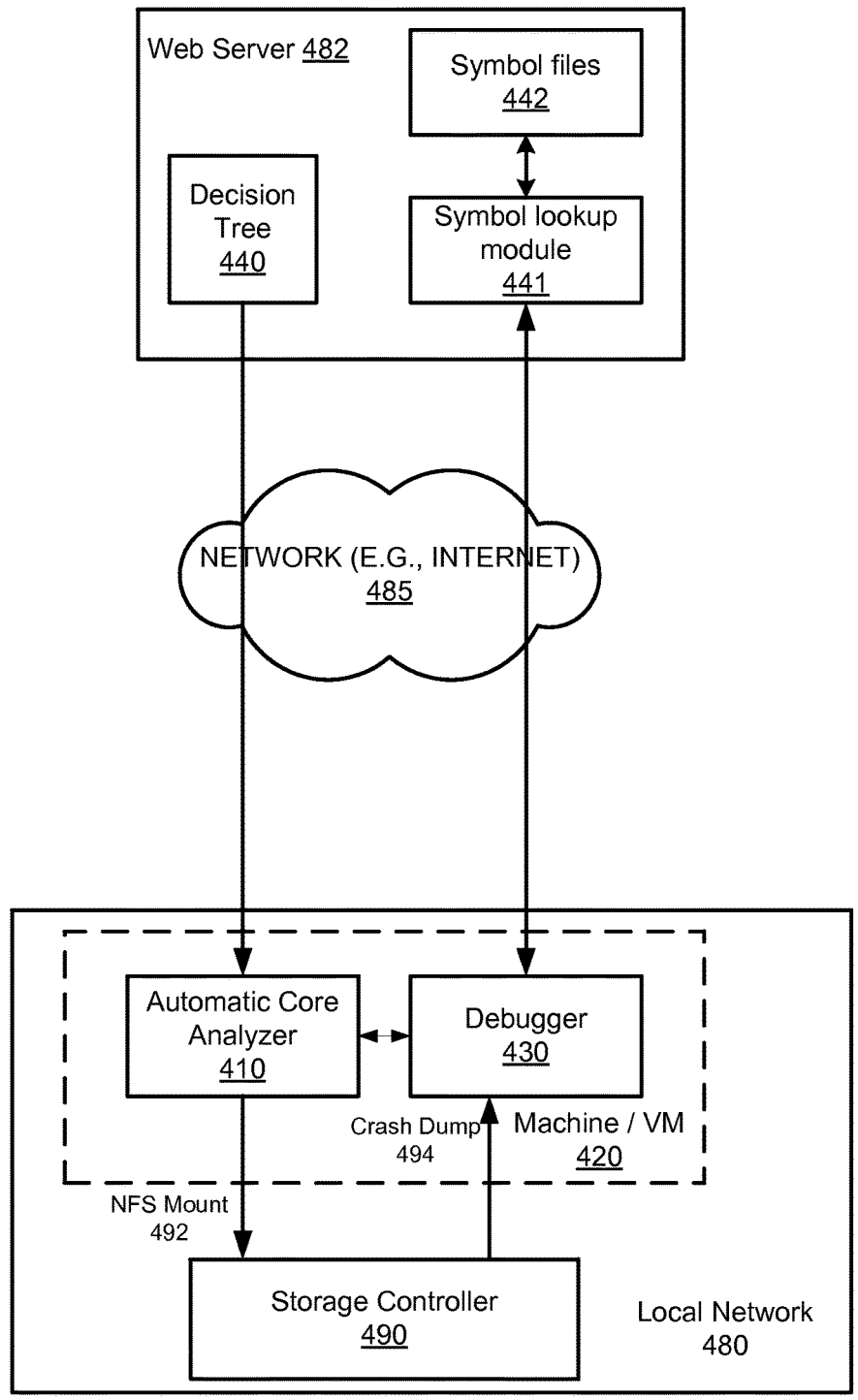
FIG. 4 illustrates an example remote analysis approach that only transfers symbol table data as required during a debugging process.

FIG. 4 illustrates an example remote analysis approach that only transfers symbol table data as required during a debugging process. In contrast to the setup of FIG. 2, this implementation illustrates how symbol files 442 can be protected from customers. Rather than sending the symbol files 442 to the local network 480 where the automatic core analyzer 410 is running, this example covers a solution to automatically analyze and extract useful information from a crash dump 494 while maintaining the security of the symbol files 442.

Normally, debuggers such as GDB read from the symbol files 442 and construct a symbol table locally to look up various entities such as variable names, function names, objects, classes, interfaces, etc. in program code. Since these symbol files 442 can be used in reverse engineering programs, they are important company assets and any compromise with these assets is not acceptable. The example illustrated in FIG. 4 decouples the symbol table logic from the debugger 430 in the local network 480 machine/virtual machine 420. In place of this normal logic, the debugger 430 instead requests individual symbols from a symbol lookup module 441 running remotely on web server 482 with access to the symbol files 442. This allows the debugger 430 to construct partial symbol tables at a client site securely. Any time the debugger 430 at the client site requires a symbol lookup, it sends a request across the network 485 to the symbol lookup module 441.

A single symbol file 442 may contain millions of entries in a symbol table. What the client machine/virtual machine 420 receives in this implementation is a very small subset of these entries, which drastically reduces the risk factor of exposing symbol files 442 outside of a company. Apart from the session level security provided by SSL, additional security like signature authentication through the REST API and encryption of the symbol cache (of certain fields) at the client end can be provided.

In addition, for performance and network latency reasons, the debugger 430 can request batches of symbol data from the symbol lookup module 441 at a time instead of individually. In one example, the debugger 430 sends multiple lookup calls through a single JSON object.

FIG. 5 illustrates an example method for remote analysis that only transfers symbol table data as required during a debugging process, in accordance with some aspects. With reference to an example of FIG. 5, a computing device crashes and reboots, for example the storage controller 490 as described with FIG. 4 (510). Similarly to the method described with FIG. 3, a machine/virtual machine 420 running the automatic core analyzer 410 and a debugger 430 mounts the storage controller 490 in order to access the crash dump 494 (520). Next, the machine/virtual machine 420 fetches a decision tree 440 from web server 482 over a network 485 (530). However, unlike the method of FIG. 4, the symbol files 442 are not fully transferred to the debugger 430. Therefore, debugger 430 cannot construct a full symbol table at the machine/VM 420. The machine/virtual machine 420 executes the automatic core analyzer 410 using the decision tree 440 in a manner as described with respect to FIG. 1 (540). While debugging, the debugger 420 retrieves symbol data from the web server 482 as required to continue the debugging process (550).

FIG. 6 illustrates an example method 600 for dynamic rule-based crash dump analysis, in accordance with some aspects. In some aspects, a dynamic rule-based crash dump analysis system retrieves debug symbol data, rules, and actions from a server over a network (610). In one aspect, these rules and actions are stored in an XML file such as decision tree 140 illustrated in FIG. 1. Based on the retrieved rules from the decision tree, an automatic core analyzer executes actions corresponding to the rules to automatically analyze a crash dump using a debugger and the debug symbol data (620). Although FIG. 1 depicts commands 170 and actions 164 separately, in some aspects these can both be thought of as "actions" that are performed based on retrieved rules. For example, commands 170 can be used to execute a process to generate data. In response to the debugger analyzing the crash dump, the automatic core analyzer takes output from the debugger for further rule processing (630). The automatic core analyzer can then create a human-readable analysis file from the parsed output (640).

FIG. 7 illustrates an example method 700 for secure debugging with symbol files accessed over a network, in accordance with some aspects. First, a debugger loads a crash dump, which can be produced when a computer system crashes as a result of a hardware or software fault (710). Rather than loading a full set of symbol table data at the beginning of debugging the crash dump, example method 700 fetches and loads symbol data into the debugger only as needed for security reasons. When the debugger needs data on a particular symbol or set of symbols, the core analyzer receives a request from the debugger for symbol lookup (720). In response, a request is sent to a remote server (e.g., a server where the full symbol files are secured stored) for the needed symbol data (730). Once received, this symbol data is loaded into the debugger (740). During the debugging process, if more symbol data is required (750), the debugger sends further requests to the core analyzer for it. If no more symbol data is required, the debugger finishes the debugging process (760).

Computer System

Figure 8:
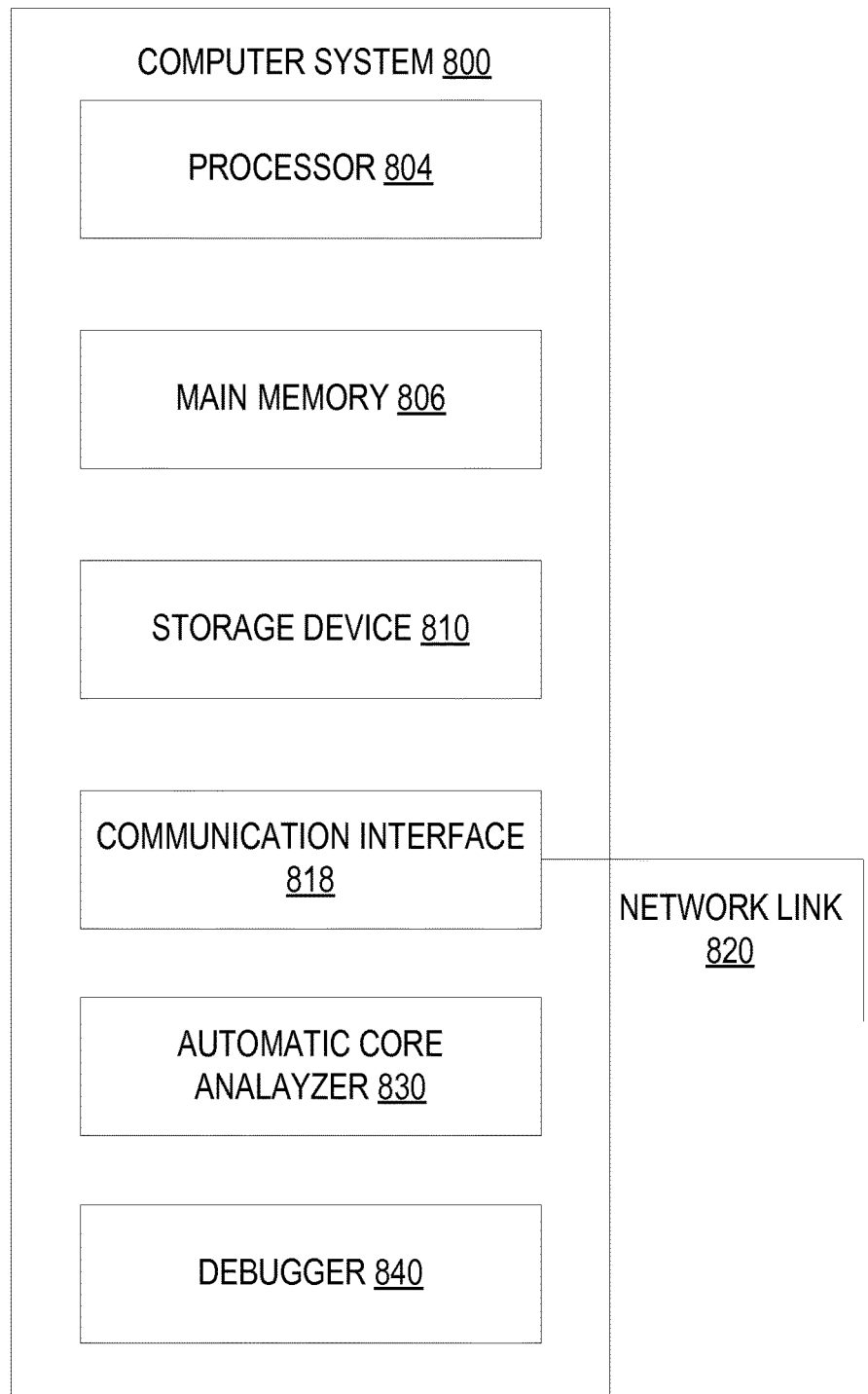
FIG. 8 is a block diagram that illustrates a computer system upon which aspects described herein may be implemented.

FIG. 8 is a block diagram that illustrates a computer system upon which aspects described herein may be implemented. For example, in the context of FIG. 1, system 100 may be implemented using one or more servers such as described by FIG. 8.

In an embodiment, computer system 800 includes processor 804, memory 806 (including non-transitory memory), storage device 810, and communication interface 818. Computer system 800 includes at least one processor 804 for processing information. Computer system 800 also includes the main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 may also include a read only memory (ROM) or other static storage device for storing static information and instructions for processor 804. The storage device 810, such as a magnetic disk or optical disk, is provided for storing information and instructions. The communication interface 818 may enable the computer system 800 to communicate with one or more networks through use of the network link 820 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks). Computer system 800 can also include an automatic core analyzer 830 and debugger 840 for the analysis and debugging of crash dumps, in accordance with some aspects.

Examples described herein are related to the use of computer system 800 for implementing the techniques described herein. According to one embodiment, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A method of crash dump analysis, the method being implemented by one or more processors and comprising:
    retrieving debug symbol data, rules, and actions from a server over a network;
    based on the retrieved rules, executing corresponding actions to automatically analyze a crash dump from a computer system which experienced a software or hardware fault, the analysis using a debugger and the debug symbol data;
    in response to analyzing the crash dump, parsing output from the debugger for further rule processing; and
    creating a human-readable analysis file based on the analyzed crash dump from the parsed output.

2. The method of claim 1, wherein the actions are generic and not specific to the debugger.

3. The method of claim 2, further comprising adapting the actions into a format compatible with the debugger.

4. The method of claim 1, wherein the retrieved rules and actions are contained in an XML decision tree.

5. The method of claim 4, further comprising:
    parsing the rules and actions from the XML decision tree; and retrieving objects associated with the rules and actions from a database.

6. The method of claim 1, wherein parsing output from the debugger for further rule processing uses forward-chaining approach until all solvable rules are solved.

7. The method of claim 1, wherein the debugger creates a symbol table using the retrieved debug symbol data.

8. The method of claim 1, wherein the retrieved debug symbol data is insufficient to create a symbol table and the debugger requests further debug symbol data from the server over the network as needed during the crash dump analysis.

9. A crash dump analysis system comprising:
a memory resource to store instructions;
one or more processors using the instructions stored in the memory resource to:
retrieve debug symbol data, rules, and actions from a server over a network;
based on the retrieved rules, execute corresponding actions to automatically analyze a crash dump from a computer system which experienced a software or hardware fault, the analysis using a debugger and the debug symbol data;
in response to analyzing the crash dump, parse output from the debugger for further rule processing; and
create a human-readable analysis file based on the analyzed crash dump from the parsed output.

10. The system of claim 9, wherein the actions are generic and not specific to the debugger.

11. The system of claim 10, further comprising instructions to adapt the actions into a format compatible with the debugger.

12. The system of claim 9, wherein the retrieved rules and actions are contained in an XML decision tree.

13. The system of claim 12, further comprising instructions to:
parse the rules and actions from the XML decision tree; and
retrieve objects associated with the rules and actions from a database.

14. The system of claim 9, wherein parsing output from the debugger for further rule processing uses forward-chaining approach until no more matching rules remain.

15. The system of claim 9, wherein the debugger creates a symbol table using the retrieved debug symbol data.

16. The system of claim 9, wherein the retrieved debug symbol data is insufficient to create a symbol table and the debugger requests further debug symbol data from the server over the network as needed during the crash dump analysis.

17. A non-transitory computer-readable medium that stores instructions, executable by one or more processors, to cause the one or more processors to perform operations that comprise:
retrieving debug symbol data, rules, and actions from a server over a network;
based on the retrieved rules, executing corresponding actions to automatically analyze a crash dump from a computer system which experienced a software or hardware fault, the analysis using a debugger and the debug symbol data;
in response to analyzing the crash dump, parsing output from the debugger for further rule processing; and
creating a human-readable analysis file based on the analyzed crash dump from the parsed output.

18. The non-transitory computer-readable medium of claim 17, wherein the actions are generic and not specific to the debugger.

19. The non-transitory computer-readable medium of claim 18, further comprising adapting the actions into a format compatible with the debugger.

20. The non-transitory computer-readable medium of claim 17, wherein the retrieved rules and actions are contained in an XML decision tree.

\* \* \* \* \*